March 15, 1949.  J. W. MARSH  2,464,330
DISTRIBUTION AND BYPASS VALVE FOR RECIPROCATING
EXPANSIBLE CHAMBER ENGINES
Filed March 3, 1945  2 Sheets-Sheet 1

*John W Marsh*
INVENTOR.

March 15, 1949. J. W. MARSH 2,464,330
DISTRIBUTION AND BYPASS VALVE FOR RECIPROCATING
EXPANSIBLE CHAMBER ENGINES
Filed March 3, 1945 2 Sheets-Sheet 2

John W Marsh
INVENTOR.

BY

ATTORNEYS.

Patented Mar. 15, 1949

2,464,330

UNITED STATES PATENT OFFICE 2,464,330

DISTRIBUTION AND BY-PASS VALVE FOR RECIPROCATING EXPANSIBLE-CHAMBER ENGINES

John W. Marsh, Arlington, Va.

Application March 3, 1945, Serial No. 580,753

6 Claims. (Cl. 121—133)

1

This invention relates to distributing and bypass valves, and more particularly to the valves used for the distribution of steam to opposite ends of a closed cylinder having a fluidtight piston reciprocating therein.

It is the object of this invention to provide a valve of this type which serves to distribute fluid to opposite ends of a cylinder and which also permits flow of fluid between opposite ends of a closed cylinder when fluid under pressure is not being supplied to the valve.

The principal application of this invention is to steam cylinders operatively connected to the wheels of a vehicle, as a locomotive, in which it is necessary to apply steam alternately to the opposite ends of the cylinder to produce power, but in which it is desirable to provide a free passage between opposite ends of the cylinder when the vehicle is in motion and not requiring power application, to prevent alternate compression and vacuum in the cylinder, which retards the motion of the vehicle and draws material through the exhaust pipe, into the cylinder which is deleterious to the surfaces and mechanism.

In the appended drawings, in which like characters indicate like parts:

Figure 1:
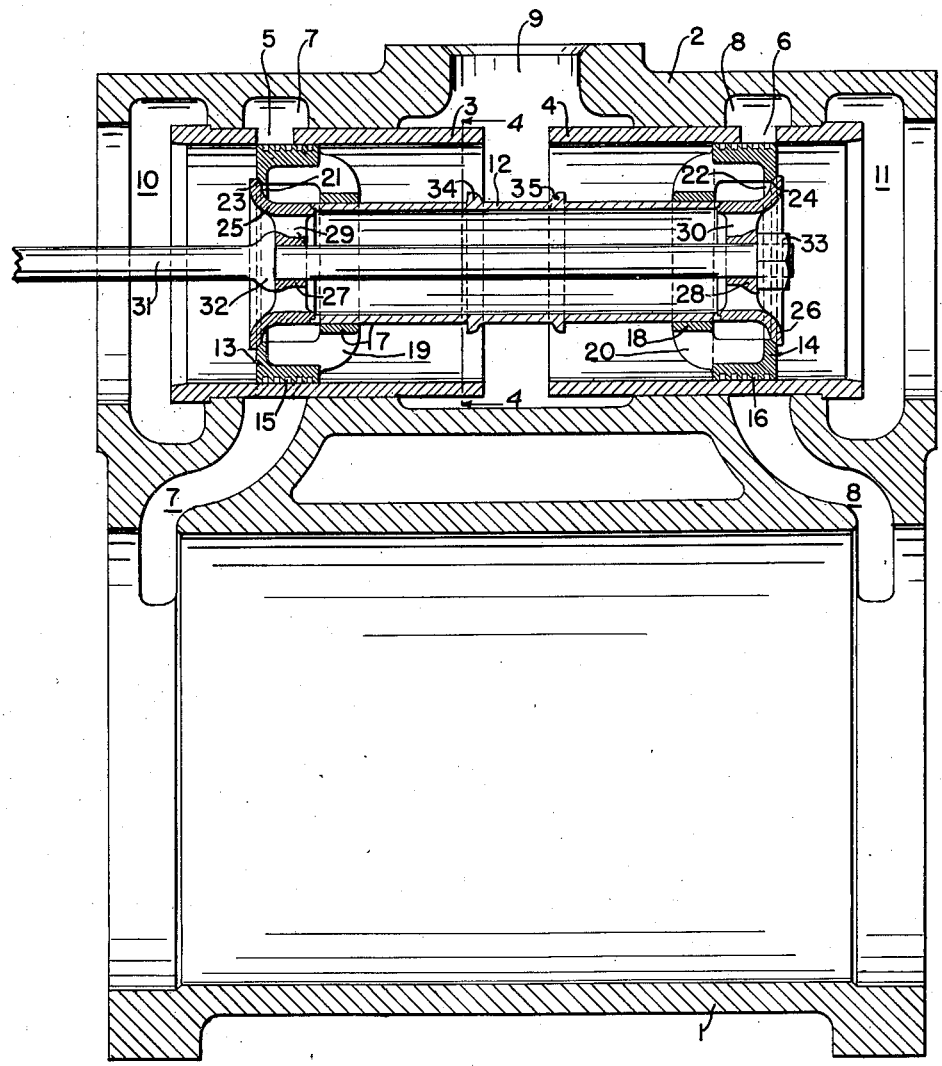
Fig. 1 is a vertical sectional view of a conventional locomotive cylinder showing a valve, embodying this invention in central position in the steam chest and in operative position when steam is applied at the central inlet.

In the figures, 1 is a locomotive cylinder provided with a steam chest 2 and containing steam chest bushings 3, 4. The bushings are provided with ports 5, 6 communicating by passages 7, 8 with opposite ends of cylinder 1. A steam inlet 9, and exhaust passages 10, 11 are provided. A piston (not shown) is slideably mounted in the cylinder 1 and the ends of the steam chest 2 and cylinder 1 are closed by covers (not shown) and provided with stuffing boxes for the passage of the piston rod and valve stem. All of the foregoing is conventional construction, and well known to those familiar with the art.

The valve comprises a tubular portion 12 on which piston structures 13, 14 are slideably mounted and which provides a bypass between

2 exhaust passages 10, 11. Pistons 13, 14 are provided with fluid tight packing rings 15, 16 and slide within bushings 3, 4, alternately covering and uncovering ports 5, 6 when fluid under pressure is applied at inlet 9 in a manner well known in the art. Pistons 13, 14 are provided with annular portions 17, 18 connected thereto by ribs 19, 20. The annular portions 17, 18 surround tubular portion 12 and form the slideable mountings of piston structures 13, 14. Pistons 13, 14 are provided with central openings 21, 22 having valve seats 23, 24 formed thereon.

At the ends of tubular portion 12, are mounted outwardly flaring portions 25, 26 which engage valve seats 23, 24. The outwardly flaring portions 25, 26 are provided with hubs 27, 28 connected thereto by ribs 29, 30. A valve stem 31, provided with collar 32 and nut 33 passes through the hubs 27, 28 and tubular portion 12, securing these elements in assembly and transmitting to these elements the reciprocating motion of a valve operating mechanism. Shoulders 34, 35 are formed on tubular portion 12 to limit the inward travel of piston structures 13, 14.

The valve structure described above and as shown on the appended drawings is adapted to reciprocate within the steam chest, such reciprocal motion being imparted by a valve operating mechanism, while fluid pressure, applied at inlet 9, acts exterior to tubular portion 12 and between piston structures 13, 14, thereby maintaining piston structures 13, 14 against outwardly flared portions 25, 26 as shown in Fig. 1, said fluid pressure being greater than the fluid pressure exhausting from cylinder 1 and acting on the exterior faces of pistons 13, 14.

Figure 2:
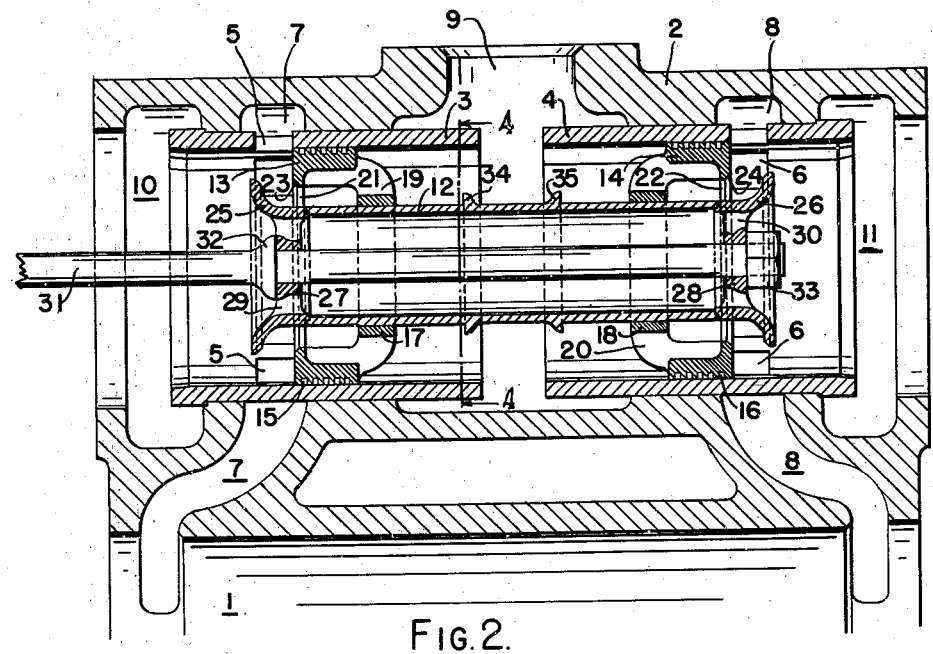
Fig. 2 is a partial sectional view of the same cylinder showing the valve in operative position when steam is not being applied at the central inlet.
Figure 4:
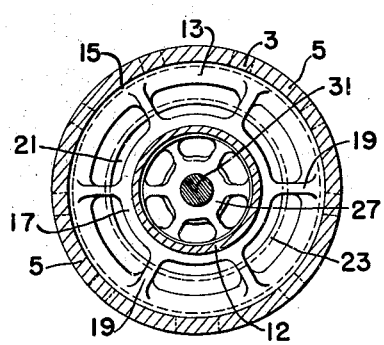
Fig. 4 is a transverse sectional view on lines 4—4 of Figures 1 and 2.
Figure 3:
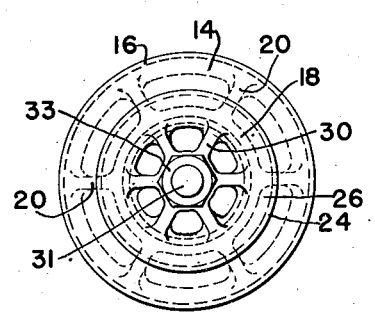
Fig. 3 is an end view of the valve shown in Figs. 1, 2.

When fluid pressure is not applied between pistons 13, 14, the reciprocal motion of the outwardly flaring portions 25, 26, attached to valve stem 31, moves pistons 13, 14 inwardly, uncovering ports 5, 6, but pistons 13, 14 remain in the positions substantially as shown in Fig. 2, with ports 5, 6 uncovered, and tubular portion 12 supported in annular portions 17, 18, and attached members reciprocate without imparting motion to pistons 13, 14. A bypass passage is thus provided between the opposite ends of cylinder 1, through passages 7, 8, ports 5, 6, through central openings 21, 22 in pistons 13, 14, and through tubular portion 12.

It will be apparent that because of the frictional resistance created by the packing rings 15, 16 against bushings 3, 4, and without fluid pressure acting between pistons 13, 14, piston structures 13, 14 will reciprocate only when contacted by outwardly flaring portions 25, 26 or by shoulders 34, 35, and at such other times the piston structures 13, 14 will be stationary and tubular portion 12 and attached members will reciprocate within annular portions 17, 18.

It will also be apparent that fluid pressure applied at inlet 9 and acting between pistons 13, 14, will maintain pistons 13, 14 against outwardly flaring portions 25, 26, with valve seats 23, 24 closed thereby, and pistons 13, 14 acting conjointly with valve stem 31 and associated members.

Modifications of the structure described and shown, and other applications thereof will suggest themselves to those skilled in the art, and it is to be understood that I do not wish to be limited to the particular details, arrangement and application shown, but by the scope of the claims.

I claim:

1. A fluid distributing valve, comprising an open ended central hollow cylindrical portion and two fluid tight port controlling piston elements surrounding the cylindrical portion, and provided with ports extending therethrough from the fronts to the back thereof, the central portion having outwardly flared ends forming valving elements, the piston elements having valve seats formed thereon and surrounding the ports thereof and adapted to engage said valving elements for closing said ports, said piston elements being slideably supported on said central portion.

2. A piston valve of the character described, comprising a tubular open ended body, having terminal, marginal stop flanges provided on their inner faces with valve portions, a pair of piston valve members slideably embracing the tubular body and located between the flanges thereof, each valve comprising a head having a hub slideably receiving the body and constituting a support therefore, said head having a central opening receiving and of greater size than the cross section of the tubular body and provided with a seat surrounding the opening and disposed for seating against the valve portion of one of the body flanges to close said opening, the periphery of the head constituting a valve portion provided with peripheral packing, the body also having another pair of external marginal stop flanges located inwardly from the terminal flanges for limiting movement of the pistons away from the terminal flanges.

3. In a valve of the character described, the combination of a valve chamber having a steam inlet and internal annular grooves at opposite sides of the steam inlet, a pair of spaced bushings disposed at opposite sides of the steam inlet and provided with ports communicating with the respective grooves, pistons having a working fit in the respective bushings, the peripheries of the pistons constituting valves controlling the ports in the housings, each piston having a central opening, an open ended tube extending through the openings in the pistons and of an external diameter less than the diameter of the openings in the pistons, each end of the tube projecting beyond the adjacent piston and provided with an external annular flange of greater diameter than the opening through the piston, each piston having a hub connected thereto by spaced arms and slideably embracing and supporting the tube.

4. In a valve of the character described, the combination of a valve chamber having a steam inlet and internal annular grooves constituting ports at opposite sides of the steam inlet, pistons having a working fit within the chamber and disposed at opposite sides of the steam inlet, the peripheries of the pistons constituting valves controlling the respective ports, each piston having a central opening, an open ended tube extending through the openings in the pistons and of an external diameter less than the diameter of the openings in the pistons and thereby providing annular ports between the exterior of the tube and the walls of the openings in the pistons, each end of the tube projecting beyond the adjacent piston and provided with an external annular flange of greater diameter than the opening through said piston, the inner faces of the pistons being subject to incoming fluid pressure and thereby held against the respective flanges which then close the openings in the pistons.

5. A distribution and bypass valve for reciprocating expansible-chamber engines comprising a valve casing having an inlet located between its ends and ports and outlets at opposite sides of the inlet, a piston valve for each port, each piston valve having a fluid pressure tight working fit with inner walls of the casing and movable back and forth across the adjacent port to open and close the same, a tubular valve stem extending loosely through the piston valves and on which the valves are slideably mounted, a stop on each end portion of the said tubular valve stem and at the outer side of the adjacent piston valve, the inner faces of the piston valves being subject to incoming fluid pressure and thereby held against the respective stops, whereby the piston valves will reciprocate with the said tubular valve stem when fluid under pressure is entering the valve casing, the piston valves having such a tight fit against inner walls of the casing that said valves will remain stationary when not subject to incoming fluid pressure and the tubular stem will reciprocate through the stationary piston valves, said tubular stem having open opposite ends in communication with said outlets at the ends of the casing for the passage of fluid under pressure alternately in opposite directions through the tubular stem.

6. A distribution and bypass valve for reciprocating expansible-chamber engines comprising a valve casing having an inlet located between its ends and ports and outlets at opposite sides of the inlet, a piston valve for each port, each piston valve having a fluid pressure tight working fit with inner walls of the casing and movable back and forth across the adjacent port to open and close the same, a tubular valve stem extending loosely through the piston valves and on which the valves are slideably mounted, a stop on each end portion of the said tubular valve stem and at the outer side of the adjacent piston valve, the inner faces of the piston valves being subject to incoming fluid pressure and thereby held against the respective stops, whereby the piston valves will reciprocate with the said tubular valve stem when pressure is entering the valve casing, the piston valves having such a tight fit against inner walls of the casing that said valves will remain stationary when not subject to incoming fluid pressure and the tubular stem will reciprocate through the stationary piston valves, said tubular stem having open opposite ends in communication with said outlets at the ends of the casing for the passage of fluid under pressure alternately in opposite directions through the tubular stem, there being an open space between the stem and each piston valve, each stop closing the space between the adjacent piston valve and the stem when said piston valve is held against the said stop by incoming fluid pressure, and said piston valves being spaced inwardly from the respective stops and the said spaces being open when the piston valves are stationary and the stem is reciprocating through the piston valves.

JOHN W. MARSH.

REFERENCES CITED

The following references are of record in the file of this patent:

UNITED STATES PATENTS

| Number | Name | Date |
|---|---|---|
| 1,458,101 | Koch | June 5, 1923 |
| 1,494,972 | Pfeiffer | May 20, 1924 |
| 1,565,964 | Schulz | Dec. 15, 1925 |
| 1,647,931 | Petty | Nov. 1, 1927 |
| 1,675,320 | Allzeit | July 3, 1928 |
| 1,950,705 | Trofimoff | Mar. 13, 1934 |

FOREIGN PATENTS

| Number | Country | Date |
|---|---|---|
| 334,066 | Great Britain | Aug. 28, 1930 |
| 614,598 | Germany | June 1, 1935 |